United States Patent
Peterson

(10) Patent No.: US 7,845,109 B2
(45) Date of Patent: Dec. 7, 2010

(54) CHEMICAL APPLICATION LINE

(76) Inventor: Jeffery Lynn Peterson, 100 N. 30th St., Parsons, KS (US) 67357

(\*) Notice: Subject to any disclaimer, the term of this patent is extended or adjusted under 35 U.S.C. 154(b) by 463 days.

(21) Appl. No.: 11/869,861

(22) Filed: Oct. 10, 2007

(65) Prior Publication Data

US 2009/0094890 A1    Apr. 16, 2009

(51) Int. Cl.
 *A01G 29/00* (2006.01)
(52) U.S. Cl. ...................................... 47/48.5
(58) Field of Classification Search ................ 47/48.5; 71/11
 See application file for complete search history.

(56) References Cited

U.S. PATENT DOCUMENTS

| | | | |
|---|---|---|---|
| 1,971,390 A | 8/1934 | Van Yahres | |
| 1,988,307 A * | 1/1935 | Fay | 71/64.13 |
| 2,091,993 A | 9/1937 | Jones | |
| 3,320,695 A | 5/1967 | Moore, Jr. | |
| 3,384,993 A | 5/1968 | Kane | |
| 3,408,823 A | 11/1968 | Okita et al. | |
| 3,454,510 A | 7/1969 | Newland et al. | |
| 4,014,675 A | 3/1977 | Osburn | |
| 4,045,204 A * | 8/1977 | Matsunaga et al. | 71/11 |
| 4,055,974 A * | 11/1977 | Jackson, Jr. | 71/11 |
| 4,158,440 A | 6/1979 | Sullivan et al. | |
| 4,161,283 A | 7/1979 | Hyman | |
| 4,187,638 A | 2/1980 | Hardy et al. | |
| 4,224,048 A * | 9/1980 | Pendergast | 71/11 |
| RE32,513 E | 10/1987 | Seaber et al. | |
| 4,898,328 A | 2/1990 | Fox et al. | |
| 4,976,062 A | 12/1990 | Rutledge et al. | |
| 5,165,351 A | 11/1992 | Billings | |
| 5,224,288 A | 7/1993 | Skelton et al. | |
| 5,497,942 A | 3/1996 | Zingle et al. | |
| 5,620,499 A | 4/1997 | Farley | |
| 5,730,773 A | 3/1998 | Farley | |
| 6,286,252 B1 * | 9/2001 | O'Neal | 47/48.5 |
| 6,319,511 B1 * | 11/2001 | Van Voris et al. | 424/411 |
| 2009/0094890 A1 * | 4/2009 | Peterson | 47/48.5 |

FOREIGN PATENT DOCUMENTS

DE    4035223 A1 *   5/1991

\* cited by examiner

*Primary Examiner*—Francis T Palo
(74) *Attorney, Agent, or Firm*—Erickson, Kernell, Derusseau & Kleypas, LLC

(57) ABSTRACT

A chemical application line is provided having a core chemical application carrier to dispense a desired chemical into a target environment over a period of time. The chemical application line includes a degradable film or paper covering the carrier to provide protection from the chemical when handling. The chemical application line also includes a degradable rope surrounding the carrier to provide strength and durability to the line.

11 Claims, 3 Drawing Sheets

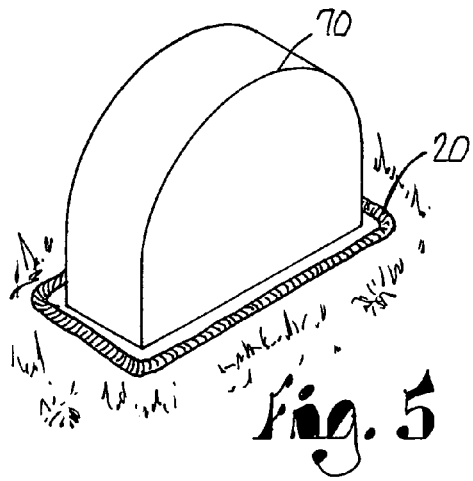
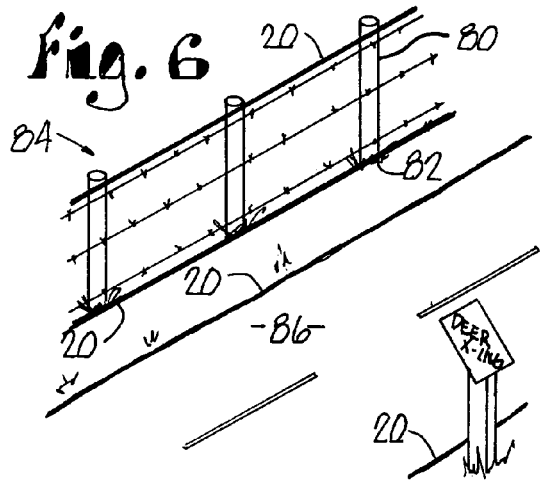
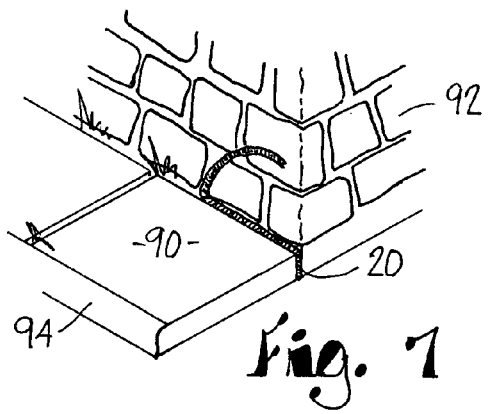
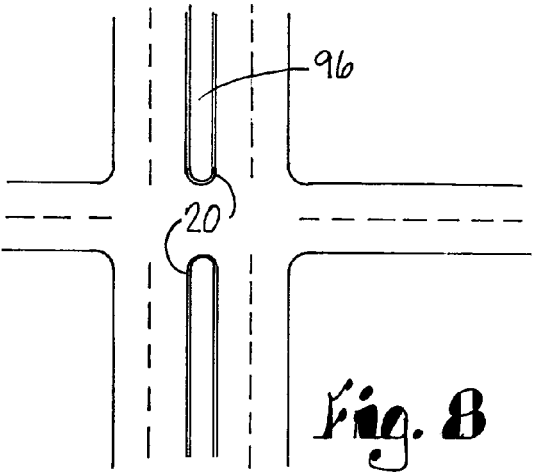
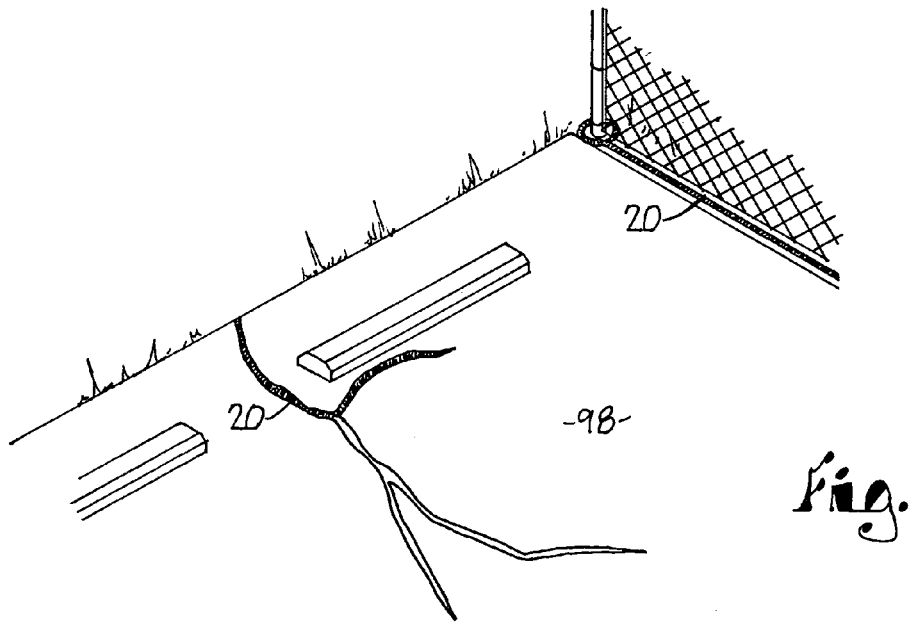

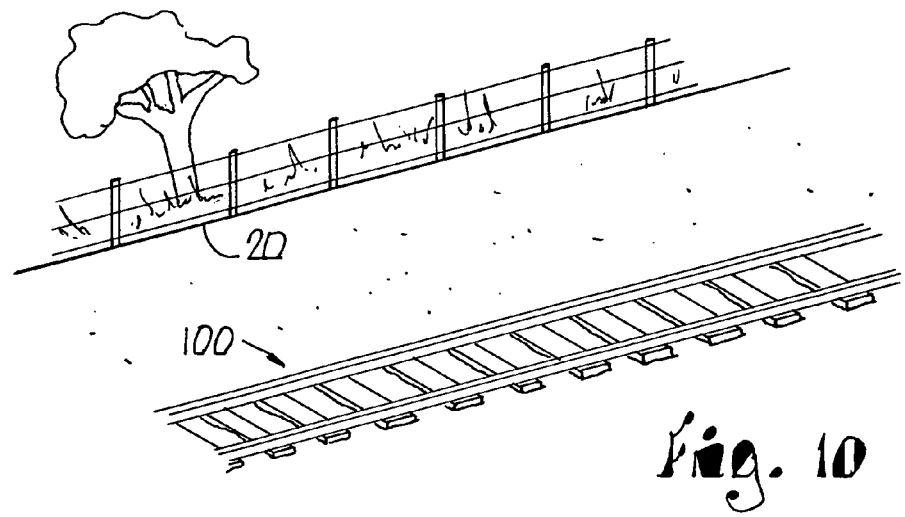
Fig. 10
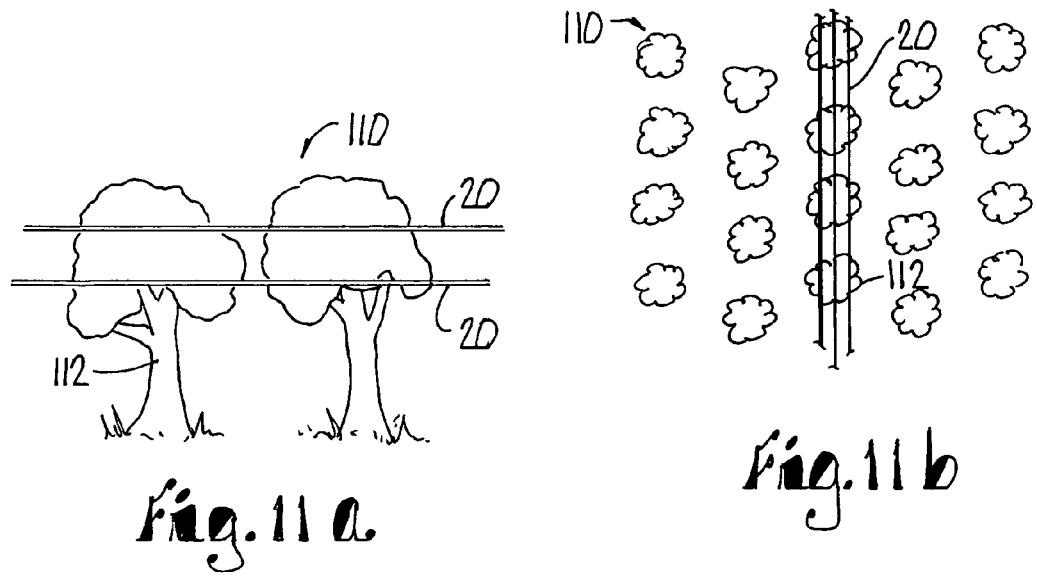
Fig. 11a
Fig. 11b
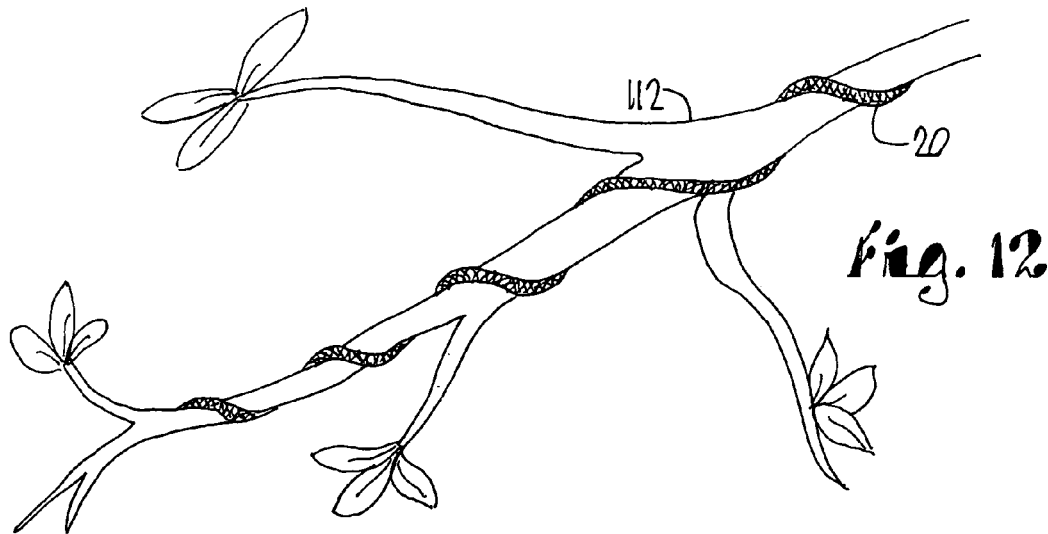
Fig. 12

CHEMICAL APPLICATION LINE

FIELD OF THE INVENTION

The present invention relates to chemical dispensing and, more particularly, to a device for selectively dispensing a chemical agent into a targeted environment.

BACKGROUND

Dispensing of a chemical agent slowly over a period of time is useful in many industries, particularly in the agriculture, railroad and roadway maintenance industries. Conventional application of fertilizers, pesticides and herbicides is time consuming and requires repeated application. Typically, application of these chemical agents is time sensitive for the chemical agent to be effective. Additionally, environmental factors such as rain may wash away the chemical requiring another application within a specified period of time for the chemical to be effective.

Various slow dispensing devices have been developed to release small amounts of fertilizer, pesticides or herbicides over an extended period of time. Some of these devices include biodegradable materials impregnated with the chemical to be dispensed. As the biodegradable material decomposes, the chemical is released. Other devices have dissolved the desired chemical in an elastomeric material at a super saturated concentration causing the chemical to bloom to the surface of the elastomer and be dispensed into the surrounding environment.

Problems associated with such slow dispensing devices include leaching of chemicals and the danger of exposure to the user, fragile carrier systems whereby the carrier material is susceptible to breakage during handling and installation, or conversely, the carrier material is not biodegradable and requires removal and disposal after a period of time.

SUMMARY

The present invention includes a biodegradable carrier material wrapped in a biodegradable paper, film or fabric to protect the user from exposure to the chemical in the carrier material, and a biodegradable, braided twine or rope surrounding the carrier material and paper to provide strength and ease of handling to the system. One or more carrier materials may be included each separately wrapped by the paper or wrapped together and surrounded by the rope.

BRIEF DESCRIPTION OF THE DRAWINGS

FIG. 5 is a perspective view of a placement of the chemical application line around a memorial stone.

FIG. 6 is a perspective view of a placement of the chemical application line along a highway.

FIG. 7 is a plan view of a placement of the chemical application line along a sidewalk.

FIG. 8 is a plan view of a placement of the chemical application line along an intersection.

FIG. 9 is a perspective view of a placement of the chemical application line along a fence.

FIG. 10 is a plan view of a placement of the chemical application line along a railroad track.

FIG. 11 is an elevation and plan view of a placement of the chemical application line in a citrus grove.

FIG. 12 is a perspective view of a placement of the chemical application line on a fruit tree branch.

DETAILED DESCRIPTION

Figure 1:
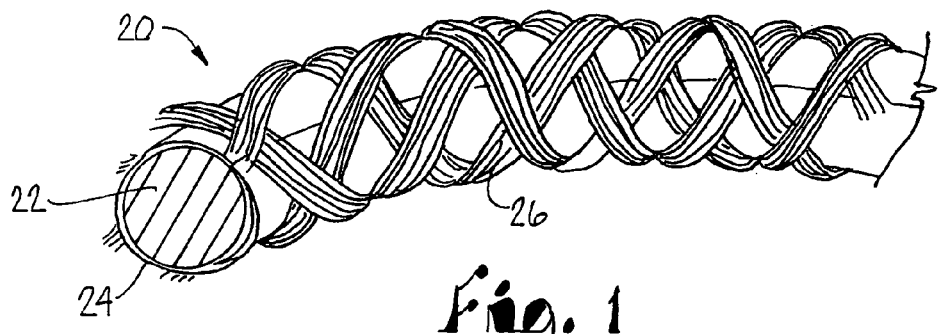
FIG. 1 is a perspective view of the chemical application line of the present invention.
Figure 2:
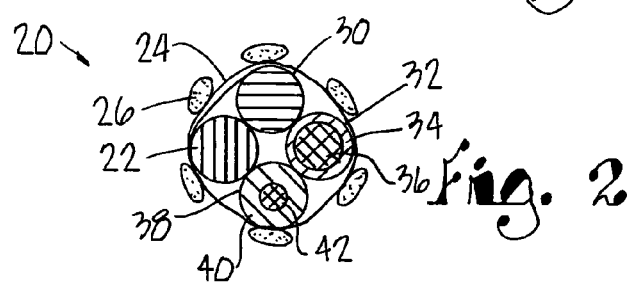
FIG. 2 is a cross sectional end view of an embodiment of the chemical application line of FIG. 1.
Figure 3:
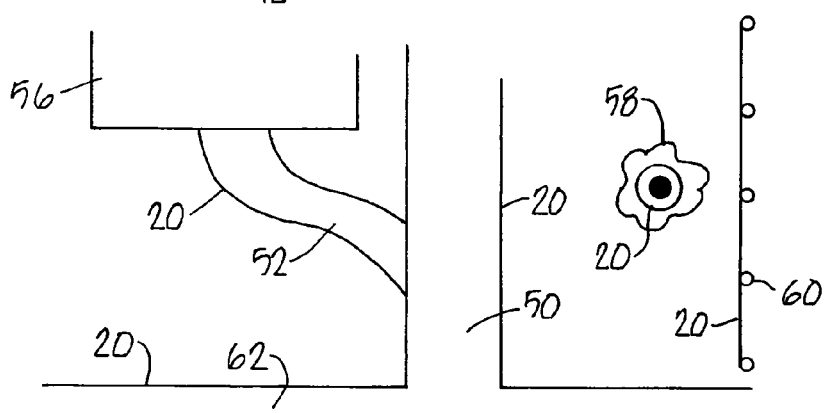
FIG. 3 is a plan view of various uses of the chemical application line of FIG. 1.
Figure 4:
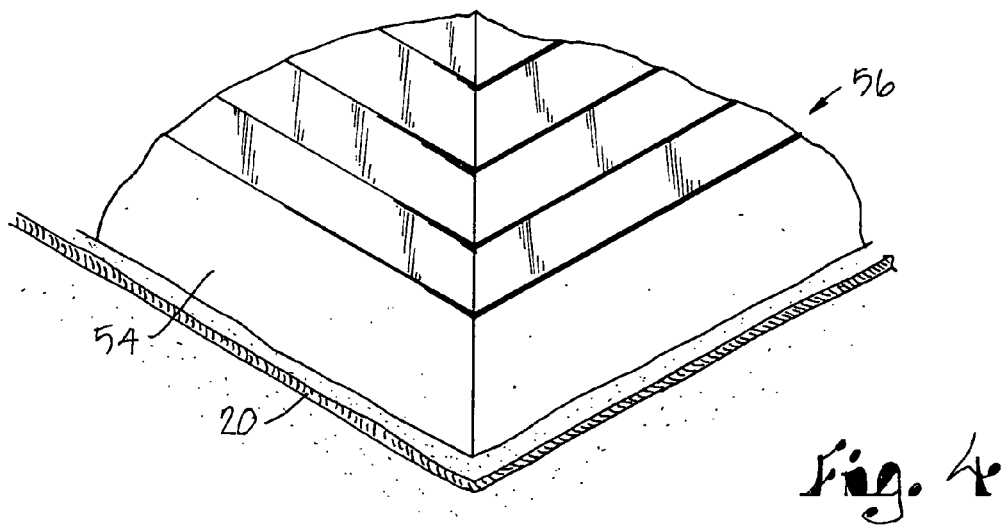
FIG. 4 is a perspective view of a placement of the chemical application line around the foundation of a house.

Referring initially to FIGS. 1 and 2, a chemical application line of the present invention is generally indicated by numeral 20. Chemical application line 20 includes core chemical carrier 22, a paper 24 wrapping the core chemical carrier 22 and a braided rope 26 surrounding the paper 24 and core chemical carrier 22.

Two or more core chemical carriers 22 may be included in the chemical application line 20. As shown in FIG. 2, four core chemical carriers 22 are included. Core chemical carriers 22 may include a number of different chemical depending on the specific application. For example, the core application carrier 22 may include fertilizers, pesticides, herbicides, insect attractants, animal repellants or an exothermic chemical heater.

Core chemical carrier 22 may include various compostable, biodegradable or degradable binding materials to contain and release the chemical at a desired rate and time. For example, the binding materials may include potato starch, corn starch, tapioca starch or sugar cane fiber individually or mixed in various combinations to achieve a desired decomposition rate according to the application and rate at which the chemical is to be discharged. These materials may decompose within 30 to 180 days or longer depending on the binding material and the environment of the application. A corn starch-based binding material typically decomposes faster than a potato or tapioca starch binding material, for example. For a six-month application of a pesticide, three core carriers 22 may be included in the chemical application line. The binding material of the first core carrier may be made of a corn starch with a decomposition time of 30 days. The second binding material may be made of a combination of corn starch and potato starch with a decomposition time of 90 days. The third binding material may be made of a potato or tapioca starch with a decomposition time of 180 days. In this manner, the pesticide may be released over a six-month period to provide continuous application of the desired pesticide or fertilizer for the desired time.

In order for the pesticide to achieve a continuous release, the first binder and pesticide mixture 30 may be homogeneous so that as the binder initially begins to break down, the pesticide is released into the environment. Second core carrier 32 may have an outer layer 34 of binder material only and an inner layer 36 of a binder and pesticide mixture. The outer layer 34 may be formulated to decompose within 30-45 days. When the inner layer 36 is reached, the pesticide begins to be released as the inner layer 36 breaks down. Because the inner layer 36 decomposes at a slower rate than the first binder, for example, a higher concentration of the pesticide may be combined with the inner layer binder 36 so that the release of pesticide is generally constant over the life of the second core carrier 32. The third core carrier 38 may include an outer layer 40 that decomposes within approximately 90 days with an inner layer 42 mixed with the pesticide that also decomposes within 90 days.

The paper 24 wrapping the core chemical carrier 22 protects the user from exposure to the chemical contained within the core chemical carrier 22. The paper 24 may be a cellulose paper, a fabric, film or other biodegradable coating or wrapping. For example, core chemical carrier 22 may be sprayed or dipped in a starch-based liquid coating to provide a protective layer. The coating 24 may readily decompose or dissolve when exposed to moisture and thereby activate the core chemical carrier 22. Alternatively, the coating 24 may be of varying thicknesses and thus time to decompose for each of the core chemical carriers 22 to provide a delayed release of the chemicals.

The braided rope 26 provides strength to the system and protects the core chemical carriers 22. The thickness and composition of the rope 26 may be tailored to the environment and the method of application. The rope 26 may be made of natural fibers such as hemp or may be made from sugar cane fibers, starches or other biodegradable materials. Selection of the type of rope 26 may be made based on the application time period of the chemical.

Referring to FIGS. 3 and 4, the chemical application line 20 may be applied along a driveway 50, a sidewalk 52, the foundation 54 of a house 56, around a tree 58, along a fence 60, and along a street 62. For the applications along the driveway 50, sidewalk 52, fence 60 and street 62, the chemical application line 20 may include a fast-acting herbicide, such as a vegetation killer, which may be released for a period of one or more years. The chemical application line 20 around the foundation 54 of house 56 may include a vegetation killer, a pesticide and a rodent repellant. The chemical application line 20 around the tree 58 may include a fertilizer for flowers or other plants around the tree 58 and a rodent repellant to discourage rabbits and other animals from eating the flowers or other plants.

Referring to FIG. 5, the chemical application line 20 may be applied around a memorial stone 70 in a cemetery to keep weeds from growing around the stone 70 and reduce the time necessary for mowing by eliminating the need to trim.

Referring to FIG. 6, the chemical application line 20 may be applied along the top 80 and bottom 82 of a fence line 84, and along a highway 86. At the top 80 of fence 84 the chemical application line 20 may include natural repellants to deter nuisance wildlife from entering a roadway, such as deer. Placed along interstates and highways at high risk areas for deer crossings, this deterrent may reduce costly accidents and save the lives of both humans and wildlife. Further placing the chemical application line 20 along the highway including a vegetation killer improves visibility and reduces the time and cost of road maintenance. Additionally, a pesticide may also be included in the chemical application line 20 along the shoulder of the highway 86 to reduce or eliminate damage from fire ants and other pests that build nests along the edge of roads causing the road to weaken and crumble.

Referring to FIGS. 7-10, the chemical application line 20 may be used to fill and treat cracks along walks 90, walls 92, curbs 94, medians 96, parking lots 98 and railroad tracks 100, keeping these areas free from weeds. Additionally, medians containing vegetation may be continually fertilized by the release of a fertilizer from the chemical application line 20.

Referring to FIGS. 11 and 12, the chemical application line 20 may be used in citrus groves 110 to help keep the trees warm during cold weather occurrences. The chemical application line may encapsulate heat packets consisting of iron powder, water, salt, activated charcoal and vermiculate. When the line 20 is stretched, the wrapping (not shown) is torn or broken to allow the compound to be exposed to air triggering an exothermic reaction to warm the citrus grove 110. The exothermic reaction may last for 6-12 hours. Multiple chemical application lines 20 may be arranged to provide longer term protection from freezing weather.

Chemical application line 20 containing insect attractants may be placed in fruit trees 112 to attract bees or other pollinating insects to enhance the yield of the fruit trees 112.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A chemical application line comprising:

an elongated, flexible core chemical carrier including a combination of first and second application chemicals and a degradable binding material, a protective degradable film covering said elongated, flexible core chemical carrier, and a degradable rope surrounding said protective degradable film, wherein said protective degradable film readily degrades when exposed to moisture, wherein said degradable rope degrades over a period of time, wherein said elongated, flexible core chemical carrier degrades over a period of time to dispense said first and second application chemicals into a target surrounding environment, and wherein said elongated, flexible core chemical carrier includes an outer layer of said first application chemical surrounding an inner layer of said second application chemical.

2. The device of claim 1 wherein said first and second application chemicals are selected from a group consisting of fertilizers, pesticides, herbicide, insect attractants, animal repellants and exothermic chemical compounds.

3. The device of claim 1 wherein said degradable binding material includes one or more materials selected from a group consisting of potato starch, corn starch, tapioca starch and sugar cane fiber.

4. The device of claim 1 wherein said first application chemical is combined with a first degradable binding material and wherein said second application chemical is combined with a second degradable binding material.

5. The device of claim 4 wherein said first and second application chemicals are selected from a group consisting of fertilizers, pesticides, herbicide, insect attractants, animal repellants and exothermic chemical compounds.

6. The device of claim 5 wherein said degradable binding material includes one or more materials selected from a group consisting of potato starch, corn starch, tapioca starch and sugar cane fiber.

7. The device of claim 4 wherein said degradable binding material includes one or more materials selected from a group consisting of potato starch, corn starch, tapioca starch and sugar cane fiber.

8. The device of claim 4 wherein said protective degradable film comprises a cellulose paper.

9. The device of claim 4 wherein said protective degradable film comprises a fabric.

10. The device of claim 4 wherein said protective degradable film comprises a biodegradable coating.

11. The device of claim 4 wherein said protective degradable film comprises a starch-based coating.

* * * * *